ically visible on the page.

United States Patent [19]

Raffali-Schreinemachers

[11] Patent Number: 5,740,374
[45] Date of Patent: Apr. 14, 1998

[54] SYSTEM FOR TRANSFERRING MESSAGES VIA DIFFERENT SUB-NETWORKS BY CONVERTING CONTROL CODES INTO REFERENCE CODE COMPATIBLE WITH A REFERENCE PROTOCOL AND ENCAPSULATING THE CODE WITH THE MESSAGE

[75] Inventor: Maria Johanna Elisabeth Raffali-Schreinemachers, The Hague, Netherlands

[73] Assignee: Koninklijke PTT Nederland N.V., Groningen, Netherlands

[21] Appl. No.: 498,907

[22] Filed: Jul. 6, 1995

[30] Foreign Application Priority Data

Jul. 11, 1994 [NL] Netherlands ............... 9401142

[51] Int. Cl.$^6$ ............... G06F 13/00
[52] U.S. Cl. ............... 395/200.68; 395/200.3; 395/200.6; 395/200.62; 395/200.66; 370/360; 370/386; 370/392
[58] Field of Search ............... 370/270, 392, 370/360, 386, 680; 395/200.3, 200.6, 200.62, 200.66, 200.68

[56] References Cited

U.S. PATENT DOCUMENTS

| | | | |
|---|---|---|---|
| 4,769,769 | 9/1988 | Bolt et al. | 395/250 |
| 4,845,706 | 7/1989 | Franaszek | 370/270 |
| 5,187,787 | 2/1993 | Skeen et al. | 395/680 |
| 5,251,205 | 10/1993 | Callon et al. | 370/392 |

OTHER PUBLICATIONS

G. Varghese et al; "Transparent Interconnection of Incompatible Local Area Networks Using Bridges"; Jan. 1990; pp. 42–48; IEEE Journal on Selected Areas in Communications, vol. 8, No. 1.

M. Rose; "Transition and Coexistence Strategies for TCP/IP to OSI"; Jan. 1990; pp. 57–66; IEEE Journal on Selected Areas in Communications, vol. 8, No. 1.

U. Shankar; "Modular Design Principles for Protocols with Application to the Transport Layer"; Dec. 1991; pp. 1687–1707; Proceedings of the IEEE, vol. 79, No. 12.

COMP-EURO 92, Computers Systems and Software Engineering, Proceedings, May 1992, Los Alamitos, U.S.A., pp. 493–496, XP 000344244, Walker "Security in Mobile and Cordless Telecommunications".

*Primary Examiner*—Thomas C. Lee
*Assistant Examiner*—Po C. Huang
*Attorney, Agent, or Firm*—Frishauf, Holtz, Goodman, Langer & Chick

[57] ABSTRACT

A transmission system for sub-networks having different transmission protocols. Control codes which are assigned to a message in a source sub-network are converted at the transition with a first intermediate sub-network, into reference codes which are compatible with a reference protocol ("meta protocol"). Subsequently, control codes are assigned both to the message and to its reference codes, which control codes are compatible with the protocol in the first intermediate sub-network. At each subsequent sub-network transition, control codes are always assigned to both the message and to the reference codes, which control codes are compatible with the local protocol of the subsequent intermediate sub-network ("tunnelling"). At the interface of the last intermediate sub-network and the destination sub-network, after removing the local control codes, the reference codes are converted into control codes which are compatible with the local protocol of the destination sub-network. In this manner "tunnelling" is possible with different protocols in source and destination sub-network. In this context, the number of translation modules is restricted.

6 Claims, 3 Drawing Sheets

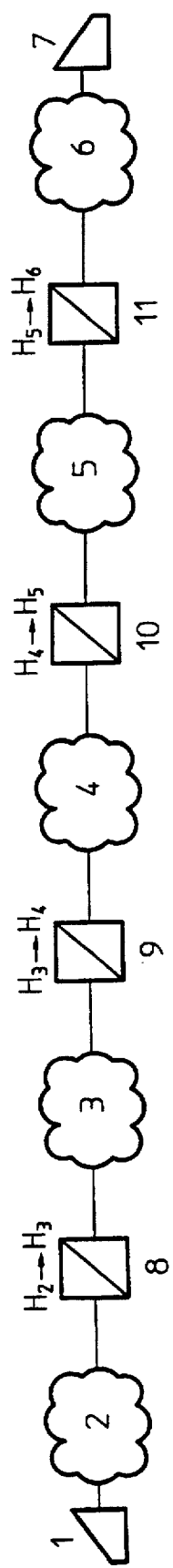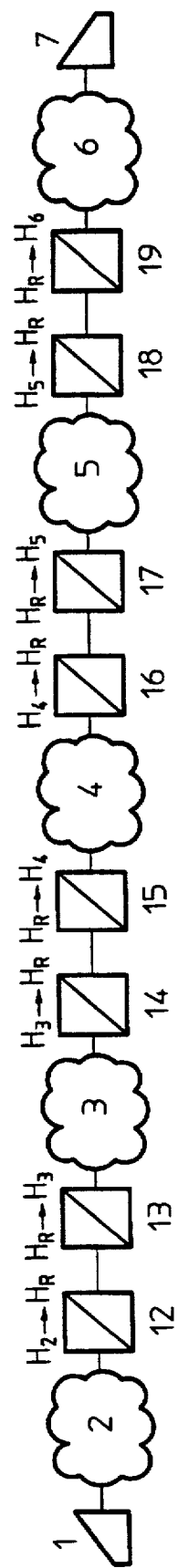

SYSTEM FOR TRANSFERRING MESSAGES VIA DIFFERENT SUB-NETWORKS BY CONVERTING CONTROL CODES INTO REFERENCE CODE COMPATIBLE WITH A REFERENCE PROTOCOL AND ENCAPSULATING THE CODE WITH THE MESSAGE

BACKGROUND OF THE INVENTION

1. Field of the Invention

The invention relates to a system for transmitting electronic messages via a network comprising various sub-networks which each use their own transmission protocol.

2. Prior-art

Messages are transferred through networks (LANs, WANs) under the control of transmission protocols (IP, ATM, DQDB, Token Ring, Ethernet) and transmission codes (Headers/Trailers, Protocol Control Information, Protocol Data Units, Service Primitives, Service Data Units) compatible therewith.

When messages have to be transferred through a network which consists of sub-networks having different protocols, it is possible to translate the transmission codes at the interfaces of said sub-networks. ATM transmission codes are for example translated into DQDB codes. As protocols can differ from each other to a considerable extent, problems can arise while translating. In this context, it can be imagined that the protocol of a sub-network through which a message is transferred has the obligation of indicating a priority code. If the protocol of the sub-network to which the message had originally been presented does not know a priority code, at the interface of both sub-networks the problem arises which value has to be taken as a priority code.

In a network with many sub-networks having mutually different protocols, many translation steps are needed. When a network comprises n sub-networks having (in an extreme case) n different protocols and all those sub-networks have to be able to transfer messages directly from and to each other (full connectivity), each sub-network has to be able to carry out translations into other n-1 protocols and vice versa, as a result of which 2*(n-1) translation modules are needed for each sub-network. In all, the network must therefore comprise 2*n*(n-1) translation modules (of which n*(n-1) differ). With large (for example international) networks translating protocols, especially manufacturing and maintaining translation modules, in a reliable manner requires substantial efforts.

In order to restrict the number of translation modules as much as possible, so-called meta-protocols or reference protocols can be used. In this context, when translating from a protocol A into a protocol B, protocol A is first translated into a reference protocol R and after that from the reference protocol R into protocol B. It is of advantage that two translation modules for each sub-network will suffice, viz. from the local sub-network protocol into the reference protocol and vice versa. With n different protocols on the whole 2*n (different) translation modules are needed in the network. It can be disadvantageous that the number of translation steps doubles, which increases the translation time and the error probability. On the other hand, however, the use of a reference protocol can reduce the error probability if a reference protocol is used which has been especially constructed for translating varying protocols (the reference protocol preferably has the characteristic of a specification language and needs not be suited for actual transmission control).

If the protocols are mutual compatible in the sub-networks where the message is presented and in the sub-network where the message has its final destination (which is called symmetric interworking) it is also possible (in stead of translating the transmission codes at the sub-network interfaces) to encapsulate, at the interface between the source sub-network and the first intermediate sub-network, the message with its original transmission codes into transmission codes which are compatible with the protocols in said intermediate sub-networks. This technique is known as "encapsulation" or "tunnelling". At the interface between the last intermediate sub-network and the destination sub-network the message, including its original transmission codes, is "wrapped out" of the intermediate transmission codes. Within the destination sub-network the original transmission codes can be used, as the protocols of the source and destination sub-network are compatible. This technique has the advantage (with regard to translating transmission codes) that no translation errors can arise and no translation modules have to be managed. However, this is on the condition that the protocols of the source and destination sub-networks are compatible. A further disadvantage can be the larger overhead.

Also, if the protocols of the source and destination sub-network are not compatible (asymmetric interworking) in the intermediate sub-networks tunnelling can be used; a translation step, however, will always be necessary. Said translation step will occur at the destination side, as the protocol at the destination side will not be known at the source side. In case of total connectivity in meshed networks, as a matter of fact each sub-network has to be provided with the translation modules from all the transmission protocols into its own protocol (as each sub-network can be a destination sub-network).

SUMMARY OF THE INVENTION

The invention is based on the understanding that with tunnelling in an asymmetric interworking situation a number of advantages can be attained by using a reference protocol. With tunnelling in an asymmetric situation it cannot be avoided to carry out a translation step, as a result of which, in case of total connectivity, each sub-network has to be provided with the translation modules from all the non-local protocols into the local protocol. However, with translating via two sub-translation actions, said sub-translation actions can advantageously be distributed over the source side and the destination side of the connection, via a reference protocol.

Regardless of the local protocol of the destination sub-network, at the source side a translation is carried out from the local source protocol into the reference protocol (the source sub-network in this context does not need to know the protocol of the destination sub-network). At the destination side, a translation is carried out from the reference protocol into the local protocol of the destination sub-network. In each intermediate sub-network, the message to be transferred and the accompanying transmission codes, which are compatible with the reference protocol, are transported, encapsulated in the local transmission codes. By distributing, in accordance with the invention, both translation actions over the source and destination sub-network (if each sub-network has to be suitable to act as a source or destination sub-network); it will be sufficient when each sub-network translation modules from the own protocol into the reference protocol and vice versa.

Furthermore, with the invention the responsibilities of the sub-networks become more clear: local traffic is transferred under the control of the local protocol; transit traffic is transferred unchanged by means of tunnelling; locally generated traffic intended for another sub-network is transferred by means of translating the control information into reference protocol format and is transferred further as transit traffic; and the control information (always in reference protocol format) of traffic originating from another sub-network and intended for the local sub-network is translated into the format of the local protocol and transferred further while using the local protocol. Translation steps are therefore only carried out at the source and destination sub-network; the intermediate sub-networks (transit sub-networks) transfer the messages, including their original control code, in a transparent manner and without manipulating the contents.

A further advantage of the invention is that tunnelling transit traffic becomes simpler, as only transmission information in reference protocol format has to be accounted for. The invention also results in an improved modularity, as in no single sub-network the characteristics (protocols, headers / trailers, etc) of other sub-networks have to be accounted for in any shape or form.

BRIEF DESCRIPTION OF THE DRAWINGS

In FIG. 1 a network with a number of sub-networks is shown, in which a message is transferred by translating the transmission codes at the interfaces of the sub-networks.

In FIG. 2 a network is shown in which a message is transferred by translating the transmission codes at the interfaces via a reference protocol.

DETAILED DESCRIPTION

Figure 3:
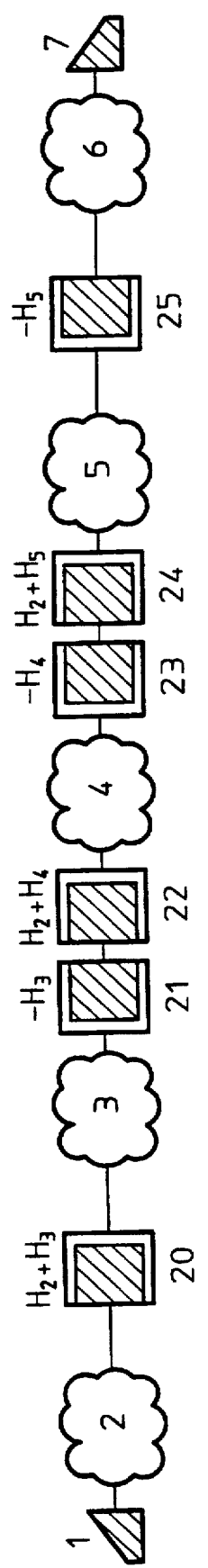
In FIG. 3 a network with a number of sub-networks is shown, with a message being transferred by means of tunneling.

FIG. 1 shows a terminal 1, which via sub-networks 2 .. . 6 transfers a message to a terminal 7. To this end the message is provided with control information which corresponds with the control protocol within the (source) network 2. In order to transfer the message to network 3, the control information (in the following represented by a header (H) and a trailer (T) with control codes) is translated in a translation member 8 into control information which is compatible with the control protocol in sub-network 3; also, the original header and trailer are replaced by a new header and trailer.

It has to be noted that the control information (transmission codes) of messages in some system are situated in the immediate vicinity of the messages to be routed (such as the headers and trailers in the present description of the figures); however, in other systems they can occur separated from said messages. Naturally the messages and their control information are mutually coupled in a logic or in a physical manner.

In the present figures, the headers and trailers are indicated by $H_x$ and $T_x$, with x indicating the sub-network. At the transitions to the subsequent sub-networks a similar translation step takes place as was described above. Via sub-network 6 the message is finally offered to terminal 7. If the entire network, consisting of the sub-networks 2 ... 6, is meshed fully and each sub-network 2 ... 6 must be capable of serving as a source, transit or destination sub-network, each translation member 8 ... 11 must be provided with translation modules from its "own" protocol into the remaining four protocols and vice versa, in all eight protocols per translation member.

In FIG. 2, the headers and trailers (at each transition of one sub-network to the other) are always first translated into a header $H_R$ and trailer $T_R$ having a format which corresponds with a reference protocol R, and then into a header and trailer which are compatible with the protocol which prevails in the new network. If the entire network, consisting of the sub-networks 2 ... 6 is meshed entirely and each sub-network 2 ... 6 must be capable of serving as a source, transit or destination sub-network, each translation member 12 ... 19 must be provided with two translation modules, viz. for translating from its own protocol into the reference protocol R and vice versa. The number of translation members 12 ... 19 in this case is, however, twice as large as in the network of FIG. 1.

Figure 3A:
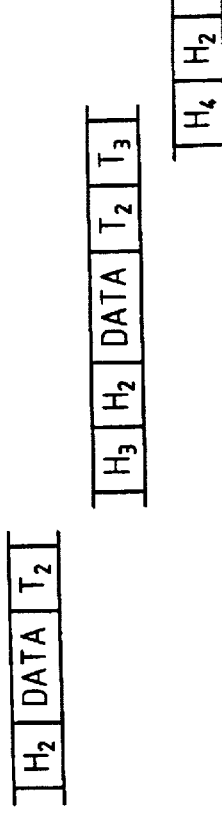
In FIG. 3a one message packet in the various sub-networks is diagrammatically shown.

FIG. 3 diagrammatically shows tunnelling a message through the network. A message, provided with a local header $H_2$ and trailer $T_2$ of sub-network 2, is encapsulated in an encapsulation member by a header $H_3$ and trailer $T_3$, suited for the protocol in sub-network 3. When leaving sub-network 3 the message with its original header $H_2$ and trailer $T_2$ is again decapsulated in decapsulation member 21 by removing header $H_3$ and trailer $T_3$. Then, in an encapsulation member 22, the message with its original header $H_2$ and trailer $T_2$ are again encapsulated by a header $H_4$ and a trailer $T_4$ which are compatible with the protocol in sub-network 4. At the transition between sub-network 4 and sub-network 5 the same occurs in the members 23 and 24, while the message with its original header $H_2$ and trailer $T_2$ are again decapsulated, in member 25, and offered to sub-network 6. A symmetric interworking situation is assumed, which means that the original header $H_2$ and trailer $T_2$ are also compatible with the protocol in sub-network 6. FIG. 3a diagrammatically always shows one data packet of the message in the sub-networks 2 ... 6. In this context, it will be noted that in the sub-networks 3, 4, and 5 the original header $H_2$ is preceded by the headers $H_3$, $H_4$, and $H_5$ respectively, and that the original trailer $T_2$ is followed by the trailers $T_3$, $T_4$, and $T_5$ respectively, which headers and trailers are compatible with the control protocols in the sub-networks 3, 4 and 5 respectively.

Figure 4:
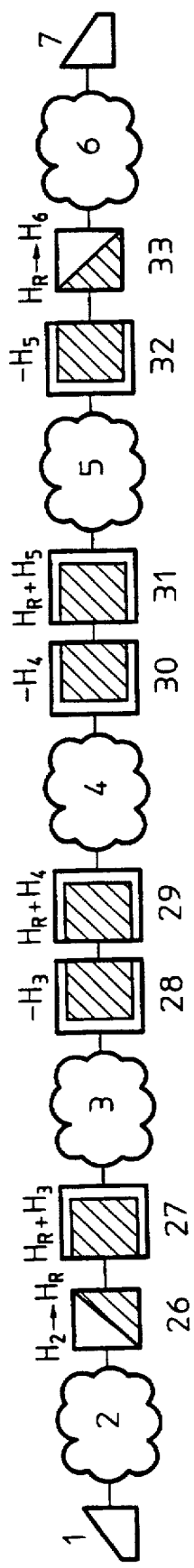
In FIG. 4 a network with sub-networks is shown, in which a message is transferred in the manner proposed by the invention.
Figure 4A:
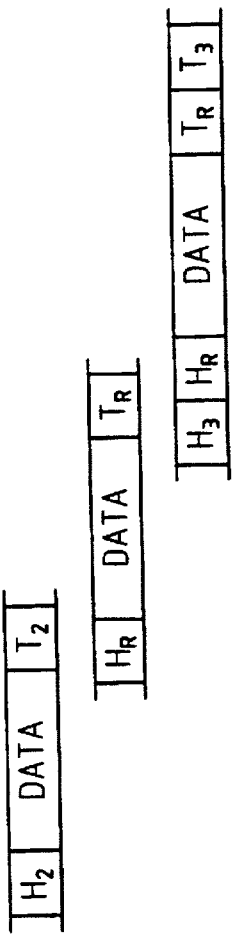
In FIG. 4a one message packet with the transmission codes in the various sub-networks is diagrammatically shown.

In FIG. 4, a message of sub-network 2 is transferred to sub-network 6 in the manner in accordance with the invention, with the message being tunnelled as transit traffic through the networks 3 ... 5 and the headers and trailers of the messages being translated at the source side and destination side. It is noted that this method can both be used in symmetric and in asymmetric interworking situations. At the transition of the sub-networks 2 and 3, in a translation member 26, the header $H_2$ and trailer $T_2$ are translated into a header $H_R$ and a trailer $T_R$ in accordance with the format of a reference protocol ("R format"), after which the message, with its new header $H_R$ and trailer $T_R$, is encapsulated in a member 27 by a header $H_3$ and a trailer $T_3$ which are compatible with the protocol of the sub-network 3. The message, with its header $H_R$ and trailer $T_R$ are tunnelled through the sub-networks 3, 4 and 5 and first decapsulated, in a decapsulation member 32, at the interface between the sub-networks 5 and 6, and subsequently translated from the R format into the format of the protocol in sub-network 6. FIG. 4a diagrammatically shows always one data packet in the sub-networks 2 ... 6. At the interface of the sub-networks 2 and 3, the header and trailer are translated into a header and trailer in R format ($H_R,T_R$), after which the message (DATA), with said header $H_R$ and trailer $T_R$, is transferred through the sub-networks 3 ... 5 by means of tunnelling, with the headers $H_3$, $H_4$, and $H_5$ and the trailers $T_3$, $T_4$, and $T_5$, respectively, being used for the transmission control. Finally, at the interface between the sub-networks 5 and 6 the message and its header $H_R$ and trailer $T_R$ are unwrapped, after which said header $H_R$ and trailer $T_R$ are converted into a header $H_6$ and trailer $T_6$ which are compatible with the protocol in sub-network 6 and which take care of the control of the message through sub-network 6 to terminal 7.

In case of total connectivity in a meshed network, all sub-networks will have to be capable of acting as a source, transit or destination sub-network; each sub-network then must have translation members and encapsulation/decapsulation members at its disposal. For each translation member two translation modules will suffice, one from the local protocol into the reference protocol and one vice versa. Each encapsulation and decapsulation member only needs to be suitable for encapsulating and decapsulating messages which are provided with a header and a trailer in R format. With these features a large degree of uniformity has been attained, which results in simplicity, modularity and easy maintainbility.

Finally, it is noted that a protocol can be used as a reference protocol, which has not necessarily been implemented as a transmission protocol, but which especially has a reference function regarding protocols which already exist or have yet to be developed. On the other hand, in practice, it is also advantageous to use as a reference protocol the protocol which most often occurs in the route between source and destination, as a result of which the number of translation or encapsulation/decapsulation actions can remain restricted to a minimum. In practice, the IP protocol will often be used then as a reference protocol, because the protocols of many sub-networks are compatible with the IP protocol.

I claim:

1. A system for transmitting an electronic message via a network including various sub-networks which use their own transmission protocol, said message being provided by a source sub-network and source transmission codes relating to said message being generated for transmission with said message, which transmission codes are compatible with the transmission protocol of said source sub-network, after which the message is transferred to a destination sub-network via various intermediate sub-networks, said system comprising:

a first converter for converting said source transmission codes into reference codes which are compatible with a reference protocol, at an interface of the source sub-network and a first said intermediate sub-network;

an encapsulation member in each intermediate sub-network for encapsulating said message and said reference codes with intermediate transmission codes related to the transmission of said message and said reference codes through the respective intermediate sub-network, in the event that the reference codes are not compatible with the transmission protocol of said intermediate sub-network, in order to transfer the message and reference codes in an encapsulated form through the intermediate sub-networks to a destination sub-network, said intermediate transmission codes being compatible with the transmission protocol of the respective intermediate sub-network; and a second converter for converting said reference codes into transmission codes which are compatible with the transmission protocol of the destination sub-network, after the message and the reference codes are transferred to the destination sub-network by the intermediate sub-networks.

2. A system according to claim 1, wherein the reference protocol corresponds with one of the transmission protocols which are in force in the sub-networks.

3. A system according to claim 1, wherein the reference protocol is formed by a formal protocol specification.

4. A method for transmitting an electronic message via a network including various sub-networks which use their own transmission protocol, said message being provided by a source sub-network and source transmission codes relating to said message being generated for transmission with said message, which transmission codes are compatible with the transmission protocol of said source sub-network, after which the message is transferred to a destination sub-network via various intermediate sub-networks, said method comprising the steps of:

converting said source transmission codes into reference codes which are compatible with a reference protocol, at an interface of the source sub-network and a first said intermediate sub-network;

encapsulating said message and said reference codes in each intermediate sub-network with intermediate transmission codes related to the transmission of said message and said reference codes through the respective intermediate sub-network, in the event that the reference codes are not compatible with the transmission protocol of said intermediate sub-network, said intermediate transmission codes being compatible with the transmission protocol of the respective intermediate sub-network;

transferring the message and reference codes in the encapsulated form through the intermediate sub-networks to a destination sub-network; and converting said reference codes into transmission codes which are compatible with the transmission protocol of the destination sub-network, after the message and the reference codes are transferred to the destination sub-network by the intermediate sub-networks.

5. A method according to claim 4, wherein the reference protocol corresponds with one of the transmission protocols which are in force in the sub-networks.

6. A system according to claim 4, wherein the reference protocol is formed by a formal protocol specification.

* * * * *